Oct. 29, 1957 C. A. WINSLOW 2,811,220
OIL FILTER AND AIR SEPARATOR
Filed Oct. 18, 1954 3 Sheets-Sheet 1
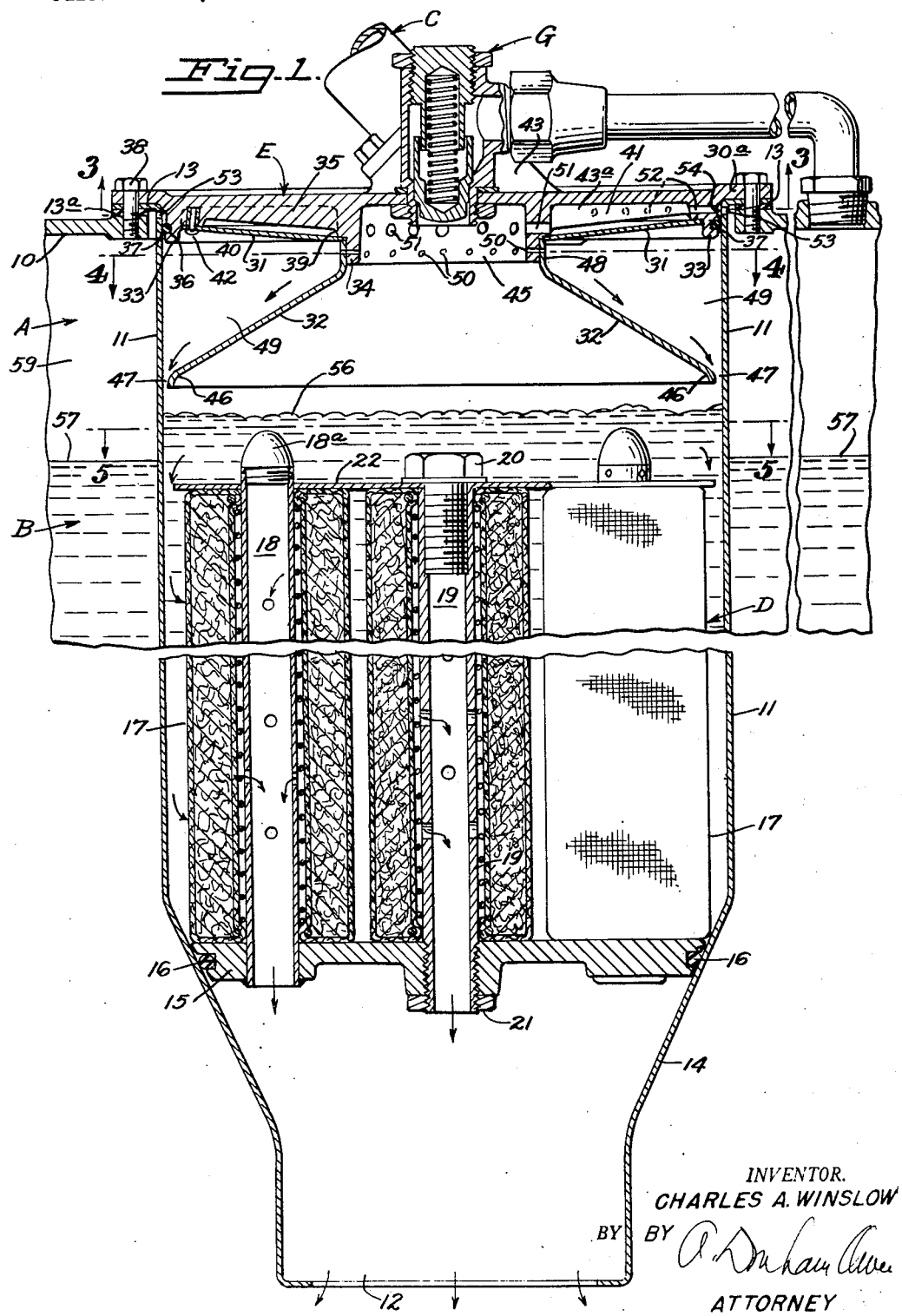
Fig. 1.
INVENTOR.
CHARLES A. WINSLOW
BY 
ATTORNEY

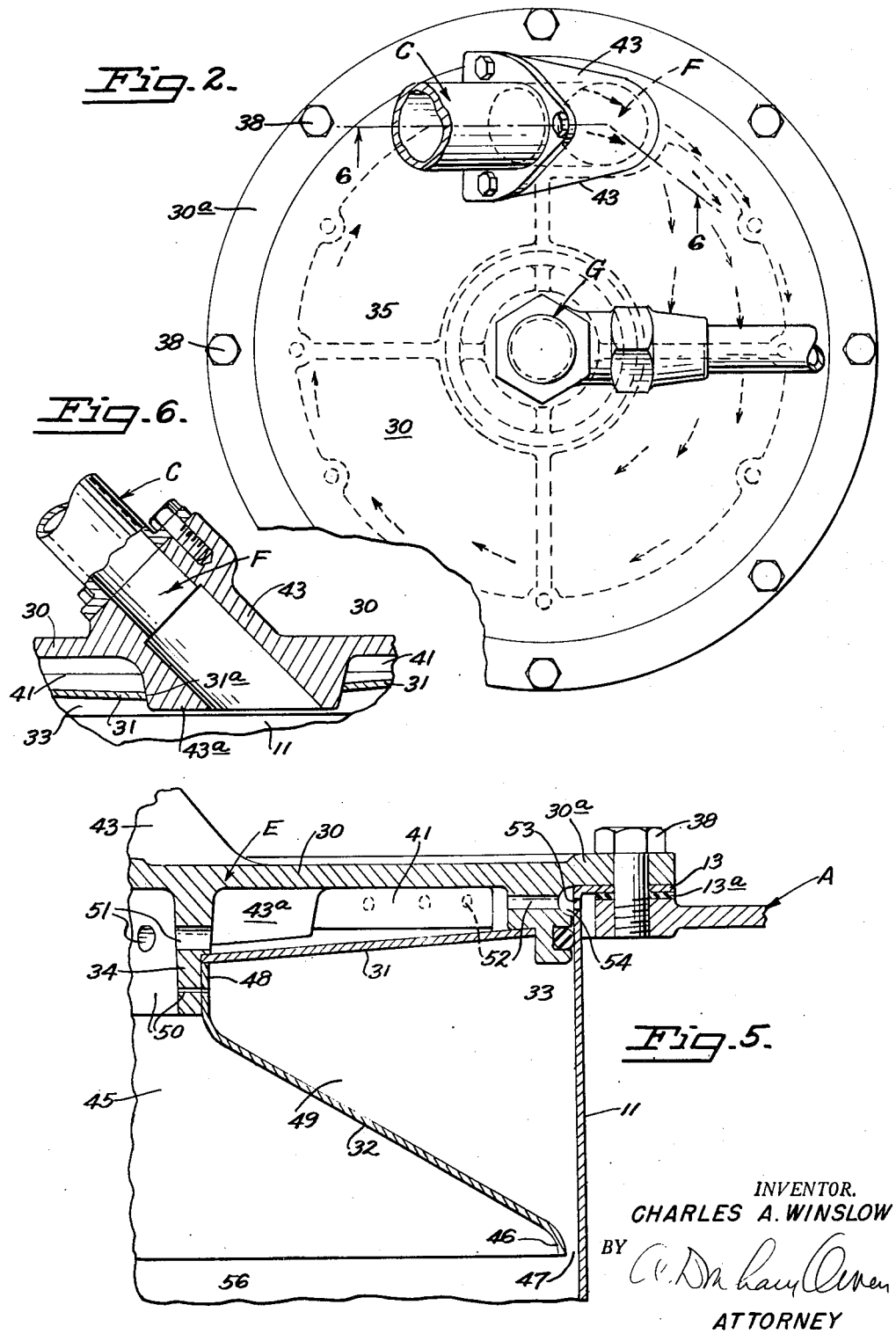

Oct. 29, 1957     C. A. WINSLOW     2,811,220
OIL FILTER AND AIR SEPARATOR
Filed Oct. 18, 1954     3 Sheets-Sheet 3
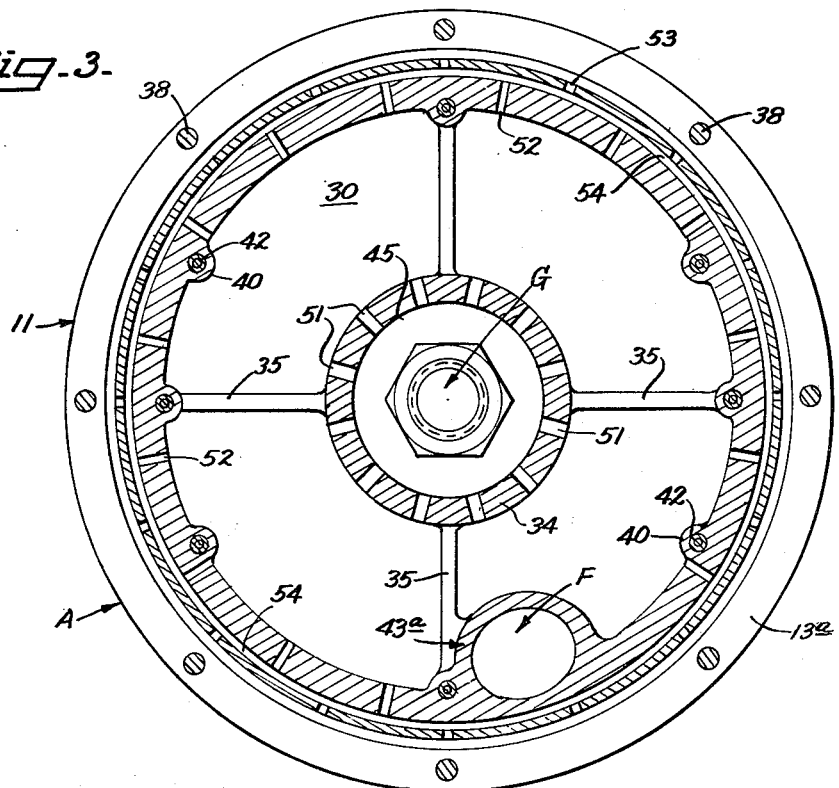
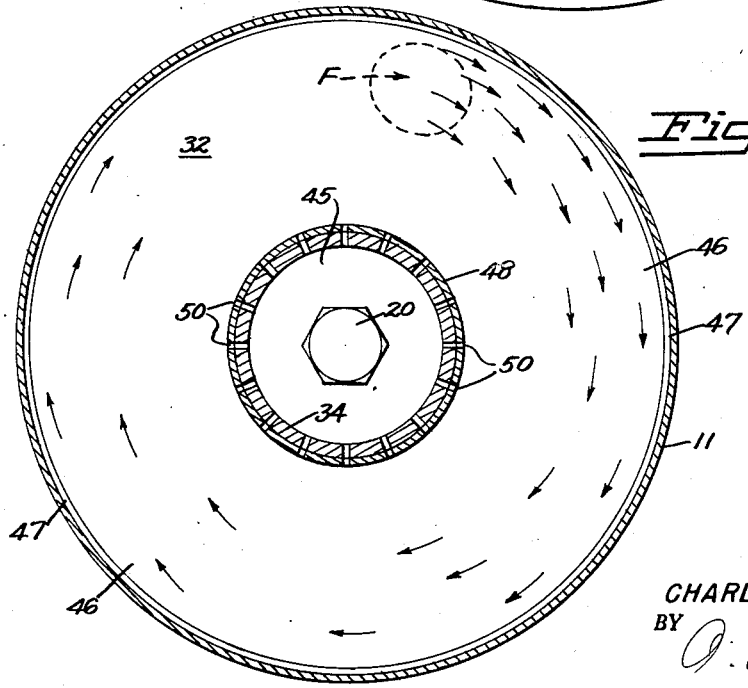
INVENTOR.
CHARLES A. WINSLOW
BY
ATTORNEY

United States Patent Office 2,811,220
Patented Oct. 29, 1957

2,811,220

OIL FILTER AND AIR SEPARATOR

Charles A. Winslow, Oakland, Calif.

Application October 18, 1954, Serial No. 462,900

8 Claims. (Cl. 183—3)

This invention relates to lubricating systems of a type employing filters or separators to purify and condition the lubricating fluid, and, more particularly, to a full-flow lubricant filter and gas or air separator for the lubricating systems of aircraft engines or other engines adapted for operation in rarefied atmospheres. This invention constitutes an improvement on a similar device disclosed in applicant's copending application, Serial Number 462,921, filed October 18, 1954.

Conventional airplane engines normally use an oil tank in the wing section from which oil is drawn for lubricating the engines under pressure. The used oil is drawn from the lower extremities of the engine by a scavenger pump or pumps and discharged back into the oil tank. This lubricating system is normally called a dry sump type pressure system. However, a very serious condition of oil foaming develops with this system, due to the fact that the scavenger pump sucks considerable foamed air along with the returned, used, dirty oil. As a result, flow through the lubricating system tends to create quantities of foam, particularly when operating at high altitudes or under conditions of reduced pressure. The presence of such foamed oil in the system not only prevents effective filtration of the dirty oil, but also interferes with the proper circulation of oil to the engine. In some cases the oil tank may eventually fill with foamed oil, air, sludge, etc., causing engine failure from faulty lubrication.

The present invention is directed to a solution to the above and many additional problems, as will appear. One object of the present invention is to provide a combination defoaming de-aerator and filter incorporating a pressure regulating device for full-flow filters, that not only uses the kinetic energy of the flowing lubricant to effect gas separation, but also creates a back pressure of separated gases to both regulate filtering pressures and to expel the separated gases from the filter.

A further object of the present invention is to regulate the pressure across the filter by the amount of gas contained in the entering lubricant, so that an increase in the ratio of liquid to gas in the entering lubricant will cause a corresponding increase in the filtering pressure, and vice versa.

Another object of the invention is to provide a baffled closure member for a filter shell having an inlet passage disposed tangentially to the shell so that the kinetic energy of entering foaming lubricant may be used to separate the liquid and gas phases of the foam bubbles by centrifugal force.

Another object of the present invention is to provide a baffle gas separation chamber for an oil filter which creates a back pressure of separated gases within the chamber by restricting the oil flow leaving the chamber. This back pressure may then be used both to expel the separated gases from the chamber and to regulate the filtering pressure within the filter shell.

Another object of the invention is to provide a combination filter, gas separator, nad filter pressure regulator that is capable of effecting complete removal of foam from foamed oil returned to the oil tanks of lubricating systems. Accordingly, an important feature of the invention is the provision of means to balance the pressure of escaping gas and air against the resistance of the oil filtering means.

Other objects and advantages of the present invention will appear from the following description and from the drawings in which:

Fig. 1 is a view in section of an illustrative device, showing the manner in which the device might be mounted in the top wall of a larger oil tank. In the view, parts are shown in elevation while others are broken away for the sake of clarity.

Fig. 2 is a top plan view of the device of Fig. 1, also broken away in part.

Fig. 3 is a view in horizontal section along the line 3—3 of Fig. 1.

Fig. 4 is a like view along the line 4—4 of Fig. 1.

Fig. 5 is an enlarged fragmentary view of one of the gas separating chambers illustrated in Fig. 1, showing in greater detail the arrangement of air passages communicating with the chamber.

Fig. 6 is a view in vertical section along the line 6—6 of Fig. 2, showing details of the inlet passage into the lubricant filter.

Referring to Fig. 1, A indicates a conventional lubricant tank such as an oil tank mounted in the wing section of an airplane. In the usual dry-sump-type pressure system, lubricating oil B is pumped from the tank A into the lubricating system of the engine and used oil is returned to the tank by scavenger pumps through the return pipe C. Attempts have been made to filter the returning dirty oil by a conventional oil filter, placed in the return line C. However, such filters are generally ineffective when high oil velocities and large quantities of foam are pumped along with the returning dirty oil.

According to the present invention, a unique combination device replaces the usual air separator or de-foaming structure and is positioned in an upper wall 10 of the tank A to provide a separate, internal tank within the oil tank A. The function of this device is not only to remove filterable materials from the returned oil, but also to effect a complete separation of the liquid-air phases of any foamed oil entering the device. A further function is to regulate filtering pressures within the filter by the relative amounts of air or liquid in the entering foaming oil.

Briefly, the present invention accomplishes these results by the provision of a baffle closure member E for the filter D. The closure member E has a tangentially-disposed inlet passage F to use the kinetic energy of the entering lubricant to effect a liquid-gas separation by centrifugal force. The closure member also provides a unique system of baffles and air passages in the upper portion of the filter, which form a unique means to regulate filtering pressures in accordance with variations in the amount and pressure of separated air.

Referring to the drawings in more detail, 11 indicates a filter shell having an open bottom 12 and a supporting flange 13 which is adapted to seat in sealing relation against the upper wall 10 of the tank A. The full-flow filter unit D is supported on a lower tapering wall portion 14 of the filter shell by a plate 15. An annular sealing ring 16 is recessed in the periphery of a plate 15 to effect a fluid seal with the filter shell 14. As a result, flow circulated through the filter must of necessity pass through one of the filter elements 17 before it can return to the oil tank through the opening 12. The individual filter elements 17 may be of any conventional design in which filtration occurs from the outside in, but preferably are of the "dual-flow" type described in U. S. Patent No. 2,559,267, whereby cold-weather clogging is reduced to a minimum.

As shown in Fig. 1, the outer ring of elements 17 have central apertured tubes 18 rigidly supported on the plate 15, as by welding, while the center element has a somewhat larger tube 19 threaded at its ends to receive the retaining bolt 20 and nut 21. The upper ends of the outlet tubes 18 are sealed by plugs 18a. Completing the filter unit D is an apertured top plate 22 which may be tightened down on the filter elements 17 by the nut 21 so that the elements are firmly positioned between the two plates 13 and 22. It will be apparent to one skilled in the art that filtration occurs when the oil flows inwardly through the filter elements 17 and out through the lower ends of tubes 18 and 19, as indicated by the flow arrows. The purpose of the filter unit D is to insure that the total flow circulated through the engine will be filtered prior to its return to the tank A. Since particular construction of the filter unit D forms no part of the present invention, its operation need not be described in greater detail.

In the drawings, the closure member E is shown as a machined or cast head 30 to which is rigidly secured a pair of baffles 31 and 32. Preferably, the head 30 is a substantially disc-shaped member having a radial supporting flange 30a, a cylindrical sealing flange 33, a central hub or protuberance 34, and strengthening ribs 35 connecting the hub and sealing flange. The diameter of the cylindrical sealing flange 33 should be slightly less than that of the filter shell 11 so that the closure E will just fit into the shell with the radial flange 30a supported on a corresponding flange 13 of the shell 11. Preferably, the sealing flange 33 is also provided with an annular groove 36 to receive a deformable sealing ring 37, so that a leak-tight closure will be insured between the head 30 and the filter shell. The combined structure of the filter shell 11 and closure E may then be supported in the tank wall by the flanges 13 and 30a, with a fluid-tight seal being provided in any convenient manner, as by gasket 13a and bolts 38.

Rigidly secured between the hub 34 and the sealing flange 33 is a dished baffle 31. As illustrated, the baffle 31 is spaced from the head 30 by a collar 39 on the hub and bosses 40 on the sealing flange so that an air space 41 is produced between the head and the baffle. Any suitable means may be provided to secure the baffle 31 to the head, such as machine screws 42 threaded into the bosses 40.

Providing fluid access to the filter through the head 30 and baffle 31 is a head conduit 43. As shown in Fig. 6, the conduit 43 protrudes above the head to a connection with the return pipe C, and has a downwardly protruding portion 43a, which is received in an opening 31a in the dished baffle 31. An air-tight seal may be provided between the conduit 43 and the opening 31a, as by welding. In this way the head conduit 43 provides an inlet passage F that extends through both the head sealing flange 33 and the baffle 31 to a point adjacent the inner cylindrical surface of the filter shell 11. For an effective defoaming action, the inlet passage F should be tangentially disposed with respect to the inner wall of the filter shell 11 and, preferably, inclined at an angle of approximately 45° to the axis of the shell. The function of the inlet passage F is to impart a circular motion to the entering fluid and thereby to initiate gas separation by centrifugal force, as will be later explained.

Depending rigidly from the hub 34 is a lower baffle 32. This baffle is generally frusto-conical in shape and extends downwardly and outwardly into an air-operating space 45 above the filter unit D. The lower extending edge 46 of the baffle 32 is spaced a slight distance inwardly from the filter shell 11 and is downwardly curved to form a circular or annular orifice 47 leading into the space 45. Preferably, the baffle 32 also has an upper cylindrical neck portion 48 that is press-fitted on a corresponding portion of the hub 34, although any other suitable securing means may be used such as welding. As best seen in Figs. 1 and 5, the space enclosed by the two baffles 31, 32 and the outer shell 11 forms an annular inlet chamber 49 below the tangential inlet passage F. While the baffles 31 and 32 have been described as separate members, it will be clear that an integral construction would be a fully equivalent structure.

To provide a discharge passage for gas separated in the inlet chamber 49, numerous, tiny gas outlets 50 are provided through the hub 34 and neck 48 of the baffle 32. These outlets connect the inlet chamber 49 with the air space 45. The hub 34 is also provided with a series of relatively larger gas ports 51 leading into the space 41 above the top baffle 31. Preferably, the ports 51 are positioned just above the hub collar 39 so that they are adjacent the lowest portion of the dished baffle 31. Venting the upper air space 41 is a series of holes 52 in the head sealing flange 33 which connect with a series of relatively minute gas vents 53 in the outer shell 11. To prevent the necessity of carefully aligning the closure E with the shell 11, an annular groove 54 may be provided about the circumference of the sealing flange 33, so that gas escaping from the holes 52 may pass to any of the vents 53.

The operation of the device is as follows: Used oil drawn from the engine is returned by a scavenger pump along with foam, air, sludge and other contaminating matter through the return pipe C. Kinetic energy received from the pump causes the foamed oil passing in through the tangentially-disposed inlet passage F to be deflected into circular motion about the inside of the chamber 49, shown by the arrows in Figs. 1 and 4. This circular motion exerts considerable centrifugal force on the heavier oil portions of the oil-and-air mixture throwing the oil outwardly down the cone-shaped baffle 32 to the circular orifice 47 which soon fills with oil. At the same time, entrained air in the entering foamy oil-and-air mixture is separated from the oil and fills the inlet chamber 49. The separated air, unable to escape through the oil restricted orifice 47, quickly builds up a back pressure within the chamber 49, which discharges the separated air through the gas outlets 50 into the top of the air space 45. Here the discharged air is joined by any air rising from broken bubbles and foam in the relatively quiescent zone 56 immediately above the oil surface, and passes out through the gas ports 51 into the upper air space 41. From the space 41 the separated gases pass out the holes 52 to the passage 54, through the vents 53, and back into the oil tank A above the normal level 57 of the oil B (Figs. 1 and 5). It should be noted that the dished baffle 31 drains back into the air space 45 through the relatively large ports 51, thus permitting practically dry air to blow out through the vents 53.

In the event that more oil and less gas are picked up by the scavenger pumps and pumped through the return line, the illustrated apparatus functions to increase the filter pressure and, consequently, to increase the flow of oil through the filter unit D. This occurs because the added amount of oil entering the inlet chamber 49 tends to restrict the gas outlets 50 by the passage of oil along with the air, causing air to fill the inlet chamber faster than it can be discharged. As a result, a substantial increase in air pressure occurs within the chamber, increasing the flow of oil through the orifice 47 into the space 45. Eventually the oil level in the space 45 may rise sufficiently to restrict the gas outlets 50 from the inside. When this occurs, even greater gas pressures develop within the inlet chamber 49, forcing more oil through the orifice 47. In addition, the higher oil level within the filter shell 11 tends to increase the filtering pressure and, consequently, the velocity of oil flow through the filter elements 17 and out the opening 12 into the tank A. The net effect is an increased oil flow to compensate for the greater proportion of oil in the entering oil-and-air mixture.

When more gas and less oil enter the inlet chamber, a reverse condition is created, resulting in a decreasing filtering pressure and a diminished flow of oil through the filter unit D. This occurs because the additional air tends to pass with the oil through the orifice 47, restoring the normal balance of oil and air in the air-separating space 45. Further increases in the volume of air entering the inlet chamber will not affect the normal functioning of the device, since the air will be rapidly vented from the air spaces 41, 45 and 49 by the vents 53.

To provide for abnormal filtering pressures, such as might occur when the filter unit D became clogged, a pressure-regulating valve G may also be provided centrally of the closure member E. This pressure-regulating valve may be of any standard construction, and serves only to regulate the maximum filtering pressure or velocity through the filter unit D. When the pressure in the filter shell 11 exceeds this maximum limit, the valve G acts to bypass the oil flow from the top of the air-separating space to the air space 59 above the oil in the tank A, as clearly shown in Fig. 1.

As will be apparent from the operation just described, the inlet chamber 49, gas outlets 50, and orifice 47 form, by combination, a filter pressure regulating device immediately sensitive to variations in the amount of air in the returned dirty oil. The element of control is achieved by a unique functioning of restricted gas outlets in conjunction with oil flow through an orifice so that filtering pressures correspond to the relative amounts of air and oil in the returned lubricant. Accordingly, more oil and less air will result in increased velocities through the filter and vice versa. In addition the device of the present invention quickly separates the entrapped air in foamy oil and provides full-flow, in-line filtration of all the dirty oil pumped into the filter. Finally, by venting the separated gases through back pressures built up by the separated gases themselves, the need for added lines or extra space in the filter is eliminated. The ultimate effect is a rapid, efficient, deaeration and filtration of dirty, foamy oil, accompanied by effective control over filtration pressures.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What I claim is:

1. A gas separator and filter pressure regulator adapted for use with an in-line filter mounted in a filter shell comprising a baffled closure member adapted to seat adjacent a perforated upper edge of the filter shell, said closure member including a disc-like member having a tangentially-directed inlet opening and a central tubular protuberance provided with at least two series of apertures in the wall thereof, pressure regulating means including a substantially cone-shaped baffle depending from said protuberance and extending to a position adjacent the filter shell to provide a circular orifice leading to said filter, said baffle having a series of gas outlets aligned with one series of apertures in said protuberance, said pressure regulating means also including a dish-shaped baffle sloping between the perforated upper edge of the filter shell and the second series of apertures in said protuberance, whereby foamed lubricant passing through said inlet opening will be separated into liquid and gas phases by centrifugal force and the liquid phase will restrict said circular orifice to build up a gas-expelling and filter pressure-regulating back pressure within a space provided by said baffles and filter shell.

2. A combination lubricant defoaming and filter pressure-regulating device for full-flow lubricant filters comprising: a vertically-disposed, open-end filter shell having a series of minute gas vents adjacent one end; a full-flow filter interposed in said shell to impede the flow of lubricant therethrough; a closure for an upper end of said shell including a tubular protuberance extending downwardly from a central portion of the closure and an inlet passage through the closure disposed to direct entering foamy lubricant tangentially downward with respect to the interior of said shell; and filter pressure regulating means including a truncated conical baffle depending outwardly from said protuberance and adjacent said shell to provide an annular orifice between the shell and baffle and a dished baffle extending from below said shell vents to said closure protuberance to form with said shell an inlet and gas separation chamber above said conical baffle; said dished baffle having an opening therethrough for said inlet passage; said conical baffle and said protuberance being provided with a series of minute, aligned gas-escape outlets; and said protuberance also having a series of gas-escape ports into a space above said dished baffle leading to the gas vents in said shell; whereby said foamy lubricant may be separated by centrifugal force into liquid and gas phases in said inlet and gas separation chamber, with the liquid phase restricting gas flow through the annular orifice so that the gas phase provides a means to both regulate filtering pressures and to expel separated gases from said inlet chamber outwardly through said gas vents.

3. A combination foamy lubricant defoaming and filter pressure regulating device for full-flow lubricant filters comprising: a cylindrical filter shell having gas vents adjacent one end thereof; a full-flow filter interposed in said shell; a frusto-conical baffle within the shell extending toward the shell and the filter and forming with the inner surface of said shell an inlet chamber on the radially outer side of said baffle means and on the inlet side of said filter and an annular orifice adjacent the filter shell, said inlet chamber having a tangentially directed fluid inlet, said baffle means also providing a gas-collection chamber on its radially inner side; and gas-passage means including gas outlets from said inlet chamber to said gas-collection chamber and a passage from said gas-collection chamber to the vents in the filter shell, baffle means separating said passage from said inlet chamber; said tangential fluid inlet causing circular motion of entering foamy lubricant whereby centrifugal force is exerted on said foamy lubricant in said inlet chamber separating it into liquid and gas phases, with the liquid phase restricting flow through said annular orifice and the gas phase providing a pressure source to both regulate filtering pressures and expel separated gases from said inlet chamber to said gas-collection chamber and thence outwardly through said gas vents.

4. The device of claim 3 in which said baffle means includes a central hub portion apertured to provide said gas outlets from said inlet chamber, the frusto-conical baffle depending outwardly from said hub, the lower edge thereof forming the inner boundary of said annular orifice adjacent the shell, the baffle means being dished and extending upwardly from the hub to provide with said shell said passage from said air collection chamber to the vents in said shell and to provide the separation between said vents and said inlet chamber.

5. A combination foamy lubricant defoaming and filter-pressure-regulating device for full-flow lubricant filters comprising: a filter shell having a series of gas vents adjacent one end thereof and a lubricant outlet adjacent its other end; a full-flow filter impeding lubricant flow through said filter shell; a closure for the vent end of said shell having an inlet passage disposed to direct foamy lubricant into the shell in a tangentially downward path with respect to the shell to centrifugally separate the foamy lubricant into liquid and gas phases; and pressure-regulating means including a baffle having a conical portion depending outwardly from said closure toward said shell to form an annular orifice adjacent the shell and having another portion separating said inlet passage from said vents, said baffle forming with said shell a lubricant inlet and gas separation chamber communicating with the filter through said orifice, said baffle having gas outlet means therethrough leading from said inlet chamber to said vents, so that lubricant separated from the foamy lubricant by centrifugal force flows toward the annular orifice and tends to restrict same to cause a back pressure in said inlet and gas separation chamber to be created by gas separated from the foamy lubricant which acts both to expel separated gases through the gas vents via said gas outlet means and to regulate lubricant pressure through said full-flow filter.

6. The device of claim 5 in which said inlet chamber is separated from said gas vents by a dished baffle portion spaced from said baffle and said closure, said gas outlet means being located on one side of said dished baffle portion; and other outlet means in said baffle communicating with the space between the dished baffle portion and the closure whereby separated gas passes from said outlet means to said gas vents on a side of said dished baffle portion opposite to said inlet chamber.

7. A combination foamy lubricant filter, gas-separator and filter-pressure-regulator, adapted to be supported vertically in a lubricant tank, comprising: a substantially cylindrical filter shell having an open bottom and a series of apertures adjacent an open top; a full-flow filter impeding the flow through said filter shell; a disc-like closure for said open top provided with a tangentially-directed inlet into said filter shell and having means for supporting said shell in a vertical position within a lubricant tank; and pressure regulating baffle means extending downwardly and outwardly interiorly from said closure toward said shell to form with said shell an inlet and gas separation chamber above said filter, said baffle means being spaced slightly inwardly from said shell to provide an annular orifice leading to said filter, said baffle also separating said inlet and gas separation chamber from said shell apertures and having openings in an upper portion in fluid communication between the upper portion of said inlet and gas separation chamber and said shell apertures, whereby lubricant entering through said tangentially-directed inlet as foamy lubricant is separated from the accompanying gas by centrifugal force and flowing toward said filter tends to restrict said circular orifice so that gas pressure is created in said inlet chamber and which acts not only to regulate filtering pressures but also to expel separated gases through said shell apertures.

8. The device of claim 7 in which a pressure-release valve is provided in said closure to limit maximum filtering pressure within said filter shell.

References Cited in the file of this patent

UNITED STATES PATENTS

| | | |
|---|---|---|
| 169,362 | Le Tellier | Nov. 2, 1875 |
| 1,176,732 | Bowser | Mar. 28, 1916 |
| 2,010,435 | Matheson | Aug. 6, 1935 |
| 2,024,719 | Cocks et al. | Dec. 17, 1935 |
| 2,252,687 | Bassett | Aug. 19, 1941 |
| 2,420,115 | Walker et al. | May 6, 1947 |
| 2,443,875 | Spangenberger | June 22, 1948 |
| 2,639,783 | Kovacs | May 26, 1953 |
| 2,705,053 | Morris | Mar. 29, 1955 |